United States Patent

[11] 3,624,549

[72] Inventors Joseph E. Geusic
Berkeley Heights;
Leo F. Johnson, Bedminster; LeGrand G. Van Uitert, Morris Township, Morris County, all of N.J.
[21] Appl. No. 816,614
[22] Filed Apr. 16, 1969
[45] Patented Nov. 30, 1971
[73] Assignee Bell Telephone Laboratories, Incorporated Murray Hill, Berkeley Heights, N.J.

[54] INFRARED DIODE-PUMPED VISIBLE LASER
16 Claims, 5 Drawing Figs.
[52] U.S. Cl. ..................................... 331/94.5, 252/301.2
[51] Int. Cl. ..................................... H01s 3/00, C09k 1/00
[50] Field of Search .......................... 331/94.5; 252/301.2

[56] References Cited
UNITED STATES PATENTS
3,284,722  11/1966  Gray .......................... 331/94.5
3,517,334  6/1970  Glatt et al. .................. 331/94.3

OTHER REFERENCES

Yb  Er  Glass Laser; Applied Physics Letters; Vol. 6, No. 3, Feb. 1965, Snitzer et al.

Guidelines for Selecting Laser Materials; Hoskins Electronics Design; July, 1965.

Energy Transfer from Er to Tm & Ho Iona in Crystals, Johnson et al., Physical Review Vol. 133 No. 2A, 1-64

Primary Examiner—Ronald L. Wibert
Assistant Examiner—Conrad Clark
Attorneys—R. J. Guenther and Edwin B. Cave ABSTRACT: Laser action in the visible spectrum is achieved by use of an infrared-emitting GaAs diode. Second photon or higher order photon processes are involved.

INFRARED DIODE-PUMPED VISIBLE LASER

BACKGROUND OF THE INVENTION

1. Field of the Invention

The invention is concerned with light-pumped solid state lasers operating in the visible spectrum.

2. Description of the Prior Art

Over the last several years, the laser art has been developed to an extremely sophisticated level. The light-pumped solid state laser is exemplary, and such devices, notably neodymium-doped yttrium aluminum garnet, can now operate CW (continuously) at room temperature with a black body light source of only about 50 watts.

Efforts to develop a practical laser in this category operating in the visible spectrum have, however, been frustrating. In fact, nothing superior to the first operating laser, ruby, which emits at the long wavelength end of the visible spectrum has emerged. It is well known that ruby is not ideal and CW operation is obtained at any temperature only with great difficulty. At room temperature, CW operation is so inefficient as to require use of mercury arc lamp pumps operating at near self-destructive levels.

Another approach involves the dye laser. Here broadband-absorbing organic dyestuffs are contained generally in an amorphous matrix. While such devices do, in fact, operate in the visible spectrum, extremely short excited-state lifetimes, generally weak absorption, and generally broad line width emission all conspire to require the use of inordinately high-level, short-pulse pumps. CW operation is not expected.

Generally, further pursuit in the directions now under investigation does not appear promising. Efficient high-level light pumps at the required wavelengths, shorter than that of the desired emission, are not available. Details of the concerned electron states required for postulated laser action in the visible spectrum—particularly above red—are generally unfavorable. Emitting ions investigated fail to meet the required conditions for a variety of reasons: absorption bands are not sufficiently broad or are not sufficiently strong, energy levels lying close to and below the desired excited states permit radiationless transfer, and/or lifetimes are inappropriate.

SUMMARY OF THE INVENTION

Many of the above disadvantages are avoided in a visible output, solid state laser in which pumping is at a longer wavelength than that of the laser emission. The responsible mechanism is a second-photon or higher-photon transition. A particular advantage is gained by use of an extremely efficient infrared source—a forward-biased gallium arsenide diode which pumps directly and selectively into a strong absorption of the trivalent ion of ytterbium. The $Yb^{3+}$, herein referred to as the sensitizer or sensitizer ion, transfers its energy, in turn, to a trivalent ion of erbium, holmium or thulium. The first excited state of this emitting ion is of sufficient lifetime that the probability of a second-photon process is large, and it is from a state associated with this second excited level that second-photon laser action occurs. In other embodiments of the invention, laser action occurs by a process which may involve a higher order photon transition, i.e., third or fourth.

While the $Yb^{3+}$ absorption is effectively matched to the output of available silicon-doped GaAs diodes operating at $0.93\mu$ (micron), the match may be further enhanced by selection of host materials providing appropriate crystal field splitting and by use of additional dopants such as indium to alter the band gap and, accordingly, the wavelength of emission of the diode.

The high absorption level of GaAs for its own infrared emission, and the high refractive index (about 3.5) of this material, resulting in large internal reflection, introduces design difficulties which are minimized in accordance with certain preferred embodiments of the invention. In accordance with one of these, dome-shaped structures are embedded directly into the laser host or into materials which are index-matched with the host.

DETAILED DESCRIPTION

1. Drawings

Figure 1:
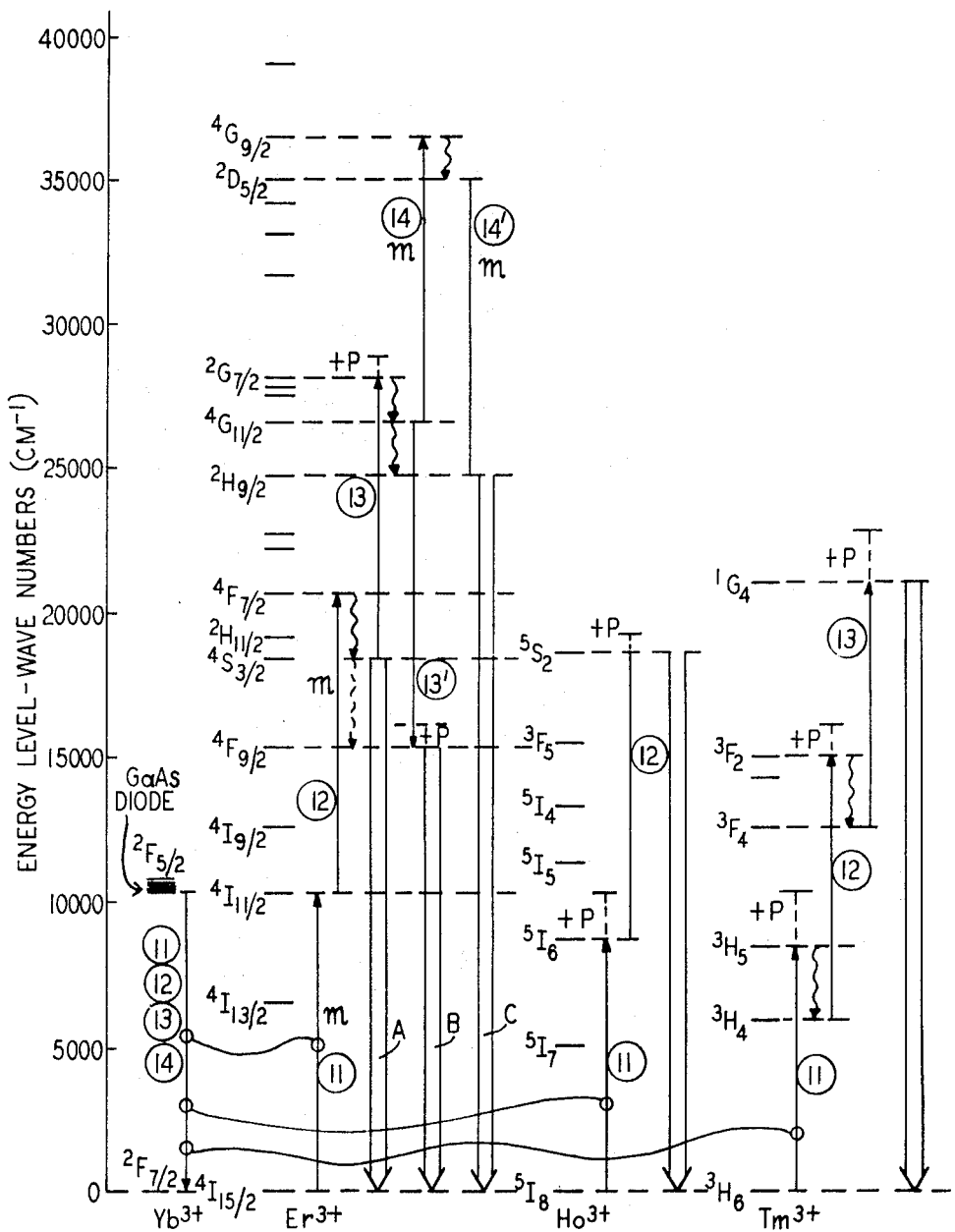
FIG. 1 is an energy level diagram of ordinate units of wave numbers for the ions $Yb^{3+}$, $Eb^{3+}$, $Ho^{3+}$, and $Tm^{3+}$.

Phosphors useful for this invention may be described in terms of the energy level diagram of FIG. 1. The diagram presented is generalized for the included ions. Certain of the specific details such as crystal field splittings are, of course, ultimately dependent upon the crystalline nature of the host. Preference for one or another of the radiative processes depicted depend, to a certain extent, on doping levels both of the sensitizer ion and the activator ion/s as well as on the host. Nevertheless, all energy manifolds depicted are invariably present and all processes, absorptive and emissive—both radiative and radiationless—are permitted.

From the standpoint of this invention, a consideration of paramount significance is the match between the diode emission wavelength and the $Yb^{3+}$ absorption. The relevance of this consideration is described under "Theoretical Consideration."

Ordinate units in FIG. 1 are in wavelengths per centimeter $(cm.^{-1})$. These units may be converted to wavelength in angstrom units (A.) or microns ($\mu$) in accordance with the relationship:

$$\text{Wavelength} = \frac{10^8}{\text{Wave numbers}} \mathring{A} = \frac{10^4}{\text{Wave numbers}} \mu$$

The left-hand portion of the diagram is concerned with the relevant manifolds of $Yb^{3+}$ in a host of the invention. Absorption in $Yb^{3+}$ results in an energy increase from the ground manifold $Yb^2F_{7/2}$ to the $Yb^2F_{5/2}$ manifold. This absorption defines a band which generally includes levels at 10,200 cm.$^{-1}$, 10,500 cm.$^{-1}$ and 10,700 cm.$^{-1}$ as is discussed under "Compositional Considerations," certain details in the diagram, in particular the specific absorptions in the $Yb^{3+}$ $^2F_{5/2}$ manifold, are enhanced by appropriate choice of material.

The remainder of FIG. 1 is discussed in conjunction with the postulated excitation mechanism. All energy level values and all relaxations indicated on the figure have been experimentally verified.

2. Postulated Excitation Mechanisms

Following absorption by $Yb^{3+}$, of emission from the GaAs diode, a quantum is yielded to the emitting ion $Er^{3+}$ (or as also discussed in conjunction with the figure, to $Ho^{3+}$ or $Tm^{3+}$). The first transition is denoted 11. Excitation of $Er^{3+}$ to the $^4I_{11/2}$ is almost exactly matched in energy (denoted by $m$) to the relaxation transition of $Yb^{3+}$. However, a similar transfer, resulting in excitation of $Ho^{3+}$ to $Ho^5I_6$ or $Tm^{3+}$ to $Tm^3H_5$, requires a simultaneous release of one or more phonons(+P). The manifold $Er^4I_{11/2}$ has a substantial lifetime, and transfer of a second quantum from $Yb^{3+}$ promotes transition 12 to the $Er^4F_{7/2}$ manifold. Transfer of a second quantum to $Ho^{3+}$ or $Tm^{3+}$ results in excitation to $Ho^5S_2$ or, after internal relaxation from $Tm^3H_5$ to $Tm^3H_4$ (by yielding energy as phonons in the matrix), excitation to $Tm^3F_2$ with simultaneous generation of a phonon. Internal relaxation is represented on this figure by the wavy arrow ($\zeta$). In erbium, the second photon level ($Er^5F_{7/2}$) has a lifetime which is very short due to the presence of close, lower lying levels which results in rapid degradation to the $Er^4S_{3/2}$ state through the generation of phonons.

The first significant emission of $Er^{3+}$ is from the $Er^4S_{3/2}$ state (18,200 cm.$^{-1}$ or cm.$^{-}\mu$ in the green). This emission is denoted in the figure by the broad (double-line) arrow A. The reverse of the second photon excitation, the nonradiative transfer of a quantum from $Er^4F_{7/2}$ back to $Yb^{3+}$ must compete with the rapid phonon relaxation to $Er^4S_{3/2}$ and is not limiting. The phonon relaxation to $Er^2F_{9/2}$ also competes with emission A and contributes to emission from that level. The extent to which this further relaxation is significant is composition dependent. The overall considerations as to the relationship between the predominant emissions and composition are discussed under the heading "Composition."

Green emission A is at a wavelength of about $0.55\mu$ in certain materials has been discussed. Red emission B may, in part, be brought about by transfer of a third quantum from $Yb^{3+}$ to $Er^{3+}$ which excites the ion from the $Er^{3+4}F_{7/2}$ to the $^2G_{7/2}$ level with simultaneous generation of a phonon (transition 13). This is followed by internal relaxation to $Er^4G_{11/2}$ which, in turn, permits relaxation to $Er^2F_{9/2}$ by transfer of a quantum back to $Yb^{3+}$ with the simultaneous generation of a phonon (transition 13'). The $Er^2F_{9/2}$ level is thereby populated by at least two distinct mechanisms and indeed experimental confirmation arises from the finding that emission B is dependent on a power of the input intensity which is intermediate in character to that characteristic of a three-phonon process and that characteristic of a two-phonon process. Emission B, in the red, is at about 15,250 cm.$^{-1}$ or 0.66 $\mu$.

While emissions in the green and red are predominant, there are many other emission wavelengths of which the next strongest designated C is in the blue (24,400 cm.$^{-1}$ or 0.41 $\mu$). This third emission designated C originates from the $Er^2H_{9/2}$ level which is, in turn, populated by two mechanisms. In the first of these, energy, is received by a phonon process from $Er^4G_{11/2}$ The other mechanism is a four-photon process in accordance with which a fourth quanta is transferred from $Yb^{3+}$ to $Er^{3+}$ exciting $Er^4G_{9/2}$ from $Er^4G_{11/2}$ (transition 14). This step is followed by internal relaxation to $Er^2D_{5/2}$ from which level energy can be transferred back to Yb relaxing Er to $Er^2H_{9/2}$ (transition 14').

Significant emission from holmium occurs only by a two-photon process. Emission is predominantly from $Ho^5S_2$ in the green (18,350 cm.$^{-1}$ or 0.54 $\mu$). A similar process in thulium also results in emission by a three-photon process (from $Tm'G_4$ in the blue at about 21,000 cm.$^{-1}$ or 0.47 $\mu$). The responsible mechanisms are clear from FIG. 2 and the foregoing discussion.

Figure 2:
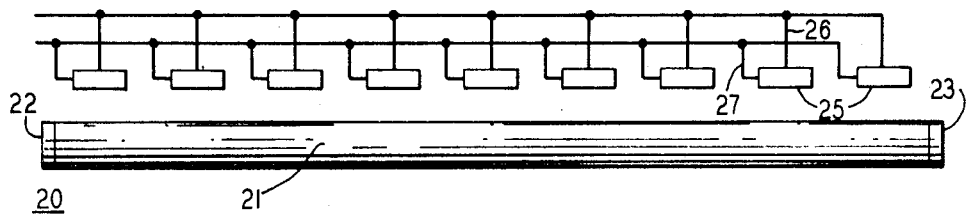
FIG. 2 is a front elevational view of an infrared diode-pumped laser.

The device of FIG. 2 is an optically pumped, solid state laser 20 comprising a single crystal rod 21 composed of a composition herein. Rod 21 is provided with reflecting layers 22 and 23. Where laser 20 is intended to operate as an oscillator, one of the two layers such as 22 may be completely reflecting while the other layer 23 may be partially reflecting. As is usual, layers 22 and 23 may be composed of a series of dielectric layers of different dielectric constant. Rod 21 is optically pumped by one or more infrared-emitting diodes 25. These are conventional infrared-emitting GaAs junction devices usually containing silicon doping and possibly containing additional dopant to modify the band gap and, accordingly, vary the wavelength of infrared emission. Each of diodes 25 is provided with electrode connections 26 and 27 connected to source not shown for forward-biasing to the emitting condition.

Figure 3:
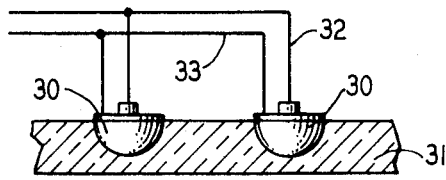
FIG. 3 is a broken section, partly in section, of a diode-pumped laser structure alternative to that of FIG. 1.

FIG. 3 depicts a broken section of a laser structure which may replace that of FIG. 2. In this embodiment, infrared-emitting diodes 30 are embedded in laser rod 31 which latter is again composed of a second photon or higher order photon phosphor. Diodes 30 are again provided with electrodes 32 and 33 connected to source not shown for biasing to the emitting condition.

It is appropriate to comment briefly on the significance of the dome-shaped diode structure 30 depicted in this figure. GaAs has a significant absorption for its own infrared emission and also has a high refractive index (about 3.5). Where transfer of infrared emission is to a medium of significantly lower index, this inherently gives rise to substantial internal reflection and, due to absorption, to substantial concomitant loss.

The effectiveness of the dome structure in minimizing such loss is already utilized in commercially available infrared diode structures. The principle of operation depends upon a nominally hemispherical configuration with an emitting junction centrally located within the flat underside surface of the hemisphere. Dimensions are such that external rays emitted by the junction are at least tangentially transmitted at the curved dome structure.

However, such commercially available structures should not be directly incorporated in embodiments in accordance with this invention. Relative nominal hemisphere radius to diode radius ratios in such commercial structures are approximately 3.5 or greater. A significant improvement in overall efficiency may be achieved in accordance with the teachings of copending application Ser. No. 816,763, filed Apr. 16, 1969, (J. E. Geusic et al. 13-17). In accordance with that application, the dome radius is reduced taking account of the fact that the transmission is into a medium having a refractive index appreciably greater than 1 (although less than 3.5).

The resulting emission of a given total amount of infrared light through a surface of reduced size results in a significant conversion efficiency within the phosphor. As discussed in detail in that application, this improvement results from the second or higher order dependence of emission on the intensity of incident infrared illumination (depending upon, whether the conversion process is a second photon or a higher order transition).

Figure 4:
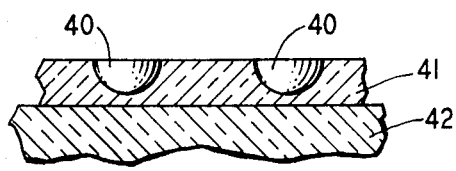
FIG. 4 is a broken section, partly in section, of still another alternative form of a structure operating in a manner of that of FIG. 3.

The broken section shown in FIG. 4 contains dome-shaped diodes 40 now simplified so as to omit electrodes but provided, nevertheless, with means, not shown, for forward-biasing to an infrared-emitting condition. These diodes, which may represent a portion of a larger series, are again embedded in a medium 41 having a refractive index numerically substantially above one and which is desirably closely index-matched to laser rod 42 or, under other circumstances, of still higher index approaching that of GaAs This structure is completely equivalent to that of FIG. 3 from the operational standpoint. Structurally it may represent certain fabrication expediencies since medium 41 may be a simple amorphous material which is merely molded or otherwise applied in position.

Figure 5:
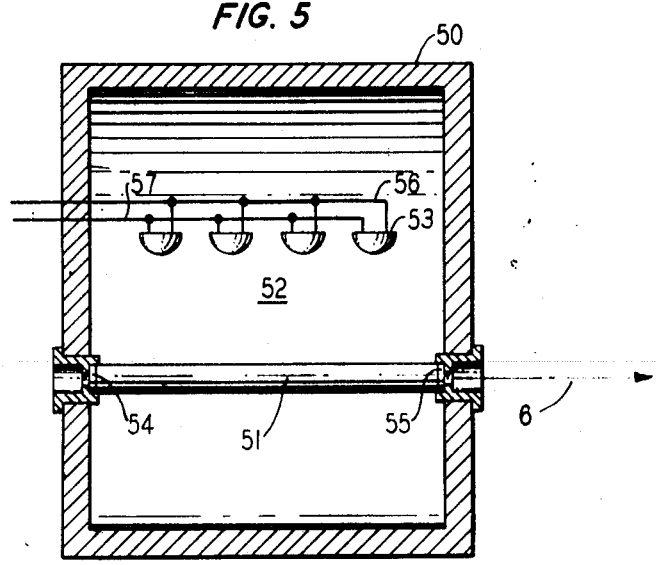
FIG. 5 is a cross-sectional view of a pump cavity and laser device again utilizing infrared diode pumping.

The device of FIG. 5 is of a known structure consisting of an elliptical cavity 50 containing laser 51 and pump 52. Unlike the usual configuration, pump 52 in this instance consists of a series of infrared-emitting diodes 52 provided with electrode connections 56 and 57 connected to biasing means not shown. For simplification, attendant apparatus including structural support members, etc., are not shown. Both diode array 52 and laser 51 are at focal points of the ellipse formed by cavity 50. Laser 51 is provided with coated ends 54 and 55 which, in this illustration, are so arranged that the former provides for complete and the latter for partial reflectance. Coherent radiation shown as arrow 56 accordingly emerges from partially reflecting end 55.

The depicted embodiments of FIGS. 2 through 5 are exemplary only and in fact are shown in somewhat simplified form. In all cases, diodes may encompass greater fractions or in fact, the entirety of available free surface of the laser. Also, advantageous use may be made of additional media, homogeneous or graded, to reduce scattering due to mismatch in refractive index.

Depending on the absorption level of the $Yb^{3+}$, it may or may not be desirable to encompass part or all of the laser with a reflector or reflective coating which is nontransmissive for the diode emission.

Compositional Considerations

In its broadest terms, the invention is directed simply to the use of a second photon or higher order photon laser medium which is pumped by means of one or more infrared-emitting diodes. As has been described, this arrangement permits extremely efficient high-intensity pumping directly into a relatively sharp absorption and so avoids at least two of the more significant problems which have beset those attempting to produce laser action at shorter visible wavelengths. Since the most efficient arrangement appears to utilize a GaAs diode (usually silicon doped, and possibly containing additional dopant to vary the band gap) the invention is so defined. It is also limited to the use of $Yb^{3+}$ as the sensitizer ion since effective energy transfer from the diode to the phosphor is not otherwise achieved.

Another general requirement arises from the need for an emitting ion, $Er^{3+}$, $Ho^{3+}$ or $Tm^{3+}$. Permitted ranges for such ions all expressed in cation percent are 3.0 to 99.98 $Yb^{3+}$, 0.05 to 20.0 $Er^{3+}$, 0.02 to 10 $Ho^{3+}$ and 0.02 to 10 $Tm^{3+}$. Preferred ranges may be expressed on the same basis as 6 to 60, 0.2 to 5, 0.1 to 2.0, and 0.1 to 2.0, respectively. Reasons for the limits are as follows: lesser amounts of $Yb^{3+}$ result in weaker and therefore less efficient transfer from the diode/s. While this may be ameliorated to some extent by reflecting members, it is considered that use of less than the extreme minimum is impractical. Maximum $Yb^{3+}$ content is premised only on a need for providing for activator content. The extreme minimum values set forth for each of the activator ions are believed necessary for laser action at reasonable pump level regardless of $Yb^{3+}$ content. Use of the preferred minima results in a reduction in threshold value for laser action. The activator ion maxima are in large part based on concentration quenching while the preferred maxima are those levels beyond which further increase results in only insignificant further reduction in laser threshold.

Of course, the specific concentrations of both sensitizer and activator ions within the ranges set forth are to a certain extent dependent upon structure, upon pump configuration and on each other. Optimum $Yb^{3+}$ content is desirably such as to result in substantially complete absorption of diode emission for the particular configuration.

Further refinements in composition are not considered within the proper scope of this disclosure and in any event, are considered within the knowledge of workers in the art.

From the inventive standpoints, the general nature of the host medium is of somewhat greater significance. For example, while simple trifluorides such as are presently available as up-converting phosphors are usefully employed, improved absorption efficiency, improved intermediate excited-state lifetime, improved radiative probability and other considerations give rise to certain preferred compositional classes.

The simple trifluorides referred to above are $LaF^3$, $GdF^3$, $LuF^3$, $YF^3$ and $BiF^3$. A preferred host class of fluorides utilizes mixed cations one of which may be totally or partially replaced by the sensitizer and activator ions described. This class of fluorides may be represented by the general formula $M^{+1} M^{3+}{}_{1-x} R_x F_{10} M^{1+}{}_3 M^{3+}{}_{1-x} R_x F_4$ and $M^{1+} M^{3+}{}_{1-x} R_x F_4$. Related fluorides include the material $M^{2+}F_2$ ($R^{3+, M1+}$) where the trivalent and monovalent ions are paired so as to be valence compensated. Another fluoride variant may be expressed as mixed crystals of $M^{2+}F_2$ and $M^{3+}{}_{1-x} R_x F_3$. In all of the above, $M^{3+}$ is defined as at least one of the ions of La, Gd, Lu, Y, Bi; R is defined as the sum of the sensitizer ($Yb^{3+}$) and activator ($Er^{3+}$, $Ho^{3+}$ and $Tm^{3+}$) ions; $M^{1+}$ is at least one of the ions of Li, Na, K, Rb, Cs, Tl; $M^{2+}$ is at least one of the ions of Ca, Sr, Ba and Pb; $x$ lies approximately between 0.05 and 1.0. Any of the fluorides may contain partial substitutions of chlorine, bromine or iodine and as so modified the simple fluorides ($M^{3+}{}_{1-x} R_x F_3$) are to be considered as part of the preferred class of materials. Up to approximately 50 anion percent of any of these halogens and particularly chlorine tends to increase visible emission, and, under certain circumstances, may therefore enhance laser action. Bonding forces binding the anions to the activator ions are weakened by increasing cation or anion size or by reducing charge; therefore, substitution of Cl, Br or I for F or including $M^{1+}$ or $M^{2+}$ ions with $M^{3+}$ ions in the host material can increase lifetimes of the active states and thereby improve laser action as well as visible emission.

Another class of otherwise appropriate phosphor materials which may be prepared in single crystal form suitable for laser use are oxidic. Of these the mixed cation materials generalized by the formula $M^{3+}{}_{1-x} R_x M'O_3$ where M' is aluminum, gallium or Scandium and $M^{3+}$ and R are as above defined are preferred. Another oxidic host is $M^{3+}{}_{1-x} R_x O_3$.

More complex systems may present certain advantages, for example, in producing such crystal field splitting as to enhance absorption by $Yb^{3+}$ at a given pump frequency (e.g., about 0.93 $\mu$). Generally, however, these more complex materials are more difficult to produce as optical grade crystals. Examples are $M^{2+}$ (W, Mo) $O_4$: $M^{1+}$, $R^{3+}$ where $R^{3+}$ is the totality of sensitizer and activator ions necessary accompanied by an equal number of valence-compensating monovalent cations. Variants are $M^{1+}$ ($M^{3+}{}_{1-x} R_x$) (W, Mo) $O_4$ and ($M^{3+}{}_{1-x} R_x$) $M^{5+} O_4$ where $M^{5+}$ represents one or more of the pentavalent of V, Nb, Ta, P.

Theoretical Considerations

It has been suggested that visible laser action is favored in the inventive system to an extent not known to be equalled by other solid state systems under investigation. A more detailed explanation follows. Discussion is in terms of the Yb-Er system in accordance with the following simplified energy diagram:

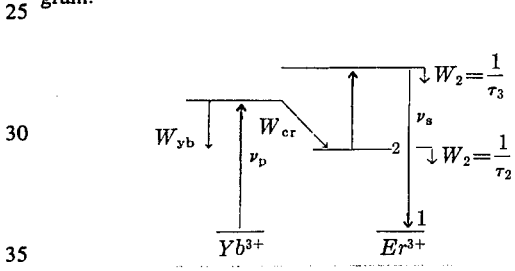

where W is the probability of the transition indicated by the subscript, $\tau$ is the lifetime again of the state indicated by the subscript, $\nu$ is the wavelength, Yb used as a subscript refers to the transition between the excited $^2F_{5/2}$ manifold and the ground manifold of that ion, cr represents the transfer from Yb to Er 2 and 3 are the first and second photon excitation erbium levels, respectively, p refers to the pump and s refers to the signal (or laser output).

If $W_{cr}$ is large compared to each of the quantities $W_{Yb}$, $W_2$ and $W_3$, the material is ideal. The simplified assumption is made that all transitions are radiative except the idler transition which is nonradiatively coupled to the lattice and these assumptions are reasonably valid for the Yb-Er system as discussed in conjunction with FIG. 1.

Under these circumstances, the following equation predicts the pump temperature at which population inversion (laser action) occurs:

$$\frac{2\nu_p}{T_p} = \frac{\nu_s}{T_s} + \frac{\nu_I}{T_I}$$

where $\nu_I$ equals $2\nu_p - \nu_s$, and $T_p$, $T_s$, $T_I$ are the equivalent radiation temperatures of pump, signal, and idler, respectively, all expressed in cm.$^{-1}$ in the ideal system $T_I$ approaches the lattice temperature which is assumed to be 300° K. In the ideal Yb-Er system, the onset of laser action occurs when $T_p$ is greater than 1,950° K. Equivalent radiation temperatures easily achieved with domed GaAs-Si diodes are in the range of 3,000° to 4,000° K.

Preferred host materials should provide for a cross-transfer probability $W_{cr}$ at least about two orders of magnitude greater than $W_2$ or $W_3$. Erbium excited states 2 and 3 should be radiative and long lived and have $W_{Yb}$ at least an order of magnitude greater than $W_2$ and/or $W_3$. Also the absorption at the Yb transition should be large, i.e., $W_{Yb}$ as large as possible.

In actuality the systems thus far tested are not ideal. While $W_{cr}$ is about three orders of magnitude greater than $W_{Yb}$, $W_{Yb}$ is only about one order of magnitude greater than $W_2$ or $W_3$. Typical probabilities expressed in reciprocal lifetimes are $10^6$ second$^{-1}$ 10$^3$ second$^{-1}$, 10$^2$ second $^{-1}$ and 10$^2$ second$^{-1}$. Under these circumstances, the required pump temperature is a minimum of about 2,400° K. which, as noted, is readily achieved with the GaAs-Si diode.

Discussion has been largely in terms of a second photon laser which in the Yb-Er system emits at a green wavelength. Other emission frequencies corresponding, for example, with B and C of FIG. 1, may be selected in the same system. Selection may be achieved in the usual manner by dielectric coatings which preferentially support the desired resonance. Of these, red emission at a wavelength of about 0.66 $\mu$, which is in part dependent upon a third photon transmission, is preferred. Also from the energy diagram of FIG. 1 it is seen that green emission may result by use of Ho$^{3+}$ and blue by use of Tm$^{3+}$.

What is claimed is:

1. Solid-state state laser for emitting coherent energy in the visible spectrum comprising a crystalline body together with pump means for illuminating with electromagnetic energy, said crystalline body being adapted for absorbing said electromagnetic energy, characterized in that said pump means is at least one PN-junction diode capable of emitting infrared energy when biased in the forward direction, in that said body contains the sensitizer Yb$^{3+}$ for absorbing such infrared energy, and further in that said body contains at least one trivalent activator ion selected from the group consisting of Er$^{3+}$, Ho$^{3+}$ and Tm$^{3+}$, in which emission of the visible spectrum results from a mechanism involving the successive absorption of at least two photons of infrared energy.

2. Device of claim 1 in which said activator ion is Er$^{3+}$ and in which the minimal Yb$^{3+}$ and Er$^{3+}$ contents based on total cation percent are 3.0 and 0.02, respectively.

3. Device of claim 1 wherein the PN-junction is a GaAs:Si diode.

4. Device of claim 1 wherein the PN-junction is a GaAs:Si, In diode.

5. Device of claim 1 in which the minimal Yb$^{3+}$ and Er$^{3+}$ contents are 6.0 and 0.2, respectively.

6. Device of claim 1 in which the crystalline body consisting essentially of at least one composition which may be represented by a formula selected from the group consisting of $M^{3+}_{1-x} R_x X_3$, $M^{1+}(M^{3+}_{1-x} R_x)_3 X_{10}$, $M^{1+}_3 M^{3+}_{1-x} R_x X_6$, $M^1 + M^{3+}_{1-x} R_x X_4$, $M^{2+}_{1-x} R_x M^{1+}_x X_2$ and mixed crystals of $M^{2+} X_2$ and $M^{3+}_{1-x} R_x X_3$ where $M^{3+}$ is the trivalent ion of at least one element selected from the group consisting of La, Gd, Lu, Y, Bi, $M^{1+}$ is the monovalent ion of at least one element selected from the group consisting of Li, Na, K, Rb, Cs and Tl, $M^{2+}$ is the divalent ion of at least one element selected from the group consisting of Ca, Sr, Ba, Pb, X is fluorine together with from zero to about 50 ion percent of a halogen ion selected from the group consisting of Cl, Br, I; R is Yb$^{3+}$ together with a trivalent ion of an element selected from the group consisting of Er, Ho, and Tm.

7. Device of claim 6 in which the minimal content of the said halogen ion is 0.1 percent of the anions present.

8. Device of claim 7 in which the said halogen ion is chlorine.

9. Device of claim 1 in which the said host exclusive of activator and sensitizer rare earths consists essentially of a compound which may be represented by a formula selected from the group consisting of $M^{3+} AlO_3$, $M^{3+} GaO_3$, $M^{3+} ScO_3$ in which $M^{3+}$ is the trivalent cation of at least one element selected from the group consisting of La, Gd, Lu, Y, Bi.

10. Device of claim 1 in which the said host exclusive of activator and sensitizer consists essentially of a compound which may be represented by a formula selected from the groups consisting of $M^{2+} WO_4$, $M^{2+} MoO_4$, $M^{1+}_{0.5} M^{3+}_{0.5} WO_4$, $M^{1+}_{0.5} M^{3+}_{0.5} MoO_4$, $M^{3+} VO_4$, $M^{3+} NbO_4$, $M^{3+} PO_4$, $TaO_4$ where $M^{2+}$ is Pb, Ba, Sr, and Ca; $M^{3+}$ is La, Gd, Lu, Y and Bi; and $M^+$ is Li, Na, K, Rb, Cs, and Tl.

11. Device of claim 1 in which said diode is dome shaped.

12. Device of claim 11 including a plurality of such diodes.

13. Device of claim 12 in which said diodes and said laser are located at the approximate foci of an elliptic cylinder cavity.

14. Device of claim 13 including a transmission path for said infrared energy for transferring energy from the said diodes to the said laser body, said path having a refractive index numerically equal to a value of at least ±5 percent of the index of said body.

15. Device of claim 14 in which the said path is contained within the said body.

16. Device of claim 12 in which the said path is contained within an amphorous region intermediate the said diodes and the said body.

* * * * *

UNITED STATES PATENT OFFICE
CERTIFICATE OF CORRECTION

Patent No. 3,624,549                     Dated November 30, 1971

Inventor(s) J.E.Geusic, L.F.Johnson, and L.G.Van Uitert

It is certified that error appears in the above-identified patent and that said Letters Patent are hereby corrected as shown below:

Col. 2, line 58, "Ho$^{3+}$ or Tm3+" should read --Ho$^{3+}$ or Tm$^{3+}$--;

line 59, "Er$^{3+}$ to the $^4I_{11/2}$" should read --Er$^{3+}$ to the $^4I_{11/2}$ --;

line 62, "Ho$^{3+}$ to Ho$^5I_6$ or Tm$^{3+}$ to Tm$^3H_5$" should read Ho$^{3+}$ to Ho$^5I_6$ or Tm$^{3+}$ to Tm$^3H_5$ --.

line 66, "Ho$^{3+}$ or Tm3+" should read --Ho$^{3+}$ or Tm$^{3+}$--.

Col. 3, line 2, "(18,200 cm.-1 or cm.-μ in the green)" should read --(18,200 cm$^{-1}$ or 0.55μ in the green)--.

Col. 4, line 10, "external rays" should read --extremal rays--.

Col. 5, line 54, "M$^{2+}$F$_2$(R$^{3+}$,M1+)" should read --M$^{2+}$F$_2$(R$^{3+}$,M$^{1+}$)--.

Col. 6, line 25 et seq. that portion of the diagram reading $W_2 = \frac{1}{\tau_3}$ should read $W_3 = \frac{1}{\tau_3}$ .

Col. 7, line 17, at the beginning of claim 1, "Solid-state state laser" should read --Solid-state laser--.

Col. 8, line 25, before "TaO$_4$" insert --M$^{3+}$-- to read --M$^{3+}$TaO$_4$--.

Signed and sealed this 4th day of July 1972.

(SEAL)
Attest:

EDWARD M. FLETCHER, JR.              ROBERT GOTTSCHALK
Attesting Officer                    Commissioner of Patents